United States Patent [19]
Paradise

[11] 3,940,763
[45] Feb. 24, 1976

[54] DIGITAL TACAN SYSTEM
[75] Inventor: Ronald Y. Paradise, Hillsdale, N.J.
[73] Assignee: The Singer Company, Little Falls, N.J.
[22] Filed: Apr. 5, 1974
[21] Appl. No.: 458,202

[52] U.S. Cl. ............................ 343/6 DF; 343/106 R
[51] Int. Cl.² .......................................... G01S 9/02
[58] Field of Search ............... 343/6 R, 6 DF, 106 R

[56] References Cited
UNITED STATES PATENTS

| | | | |
|---|---|---|---|
| 3,383,687 | 5/1968 | Shames | 343/106 R |
| 3,456,259 | 7/1969 | Harris | 343/106 R |
| 3,659,291 | 4/1972 | Anthony | 343/6 R |
| 3,685,053 | 8/1972 | Kirkpatrick | 343/6 R X |

*Primary Examiner*—T. H. Tubbesing
*Attorney, Agent, or Firm*—T. W. Kennedy

[57] ABSTRACT

A digital tacan system which provides improved bearing and range accuracy and allows faster acquisition. In computing, both bearing and range updates are maintained current using a Kalman filter. Portions of the computation may be performed in an on-board computer with the remainder done is a special purpose computer capable of being implemented using a few custom made MOS/LSI chips.

11 Claims, 12 Drawing Figures

DIGITAL TACAN SYSTEM

BACKGROUND OF THE INVENTION

This invention relates to aircraft navigation in general and more particularly to a digital Tacan processor for use in aircraft.

Tacan equipment is used on most military aircraft to provide an indication of the distance, and bearing to any selected Tacan station. In a Tacan system, a ground station transmits Tacan pulses at a rate of approximately 2700 per second. The ground station antenna rotates 15 times per second and has an antenna directivity pattern which has a cardioid component to it. This causes the pulses received by the aircraft to have a 15 hertz modulation of plus or minus 20% amplitude and a phase which depends upon the aircraft's bearing with respect to the Tacan station. The transmitter also sends a reference pulse code once each antenna cycle at a fixed point in the antenna rotation to establish an absolute reference phase. The aircraft equipment determines the bearing by comparing the phase of the amplitude modulated signal with the reference phase pulses. For further accuracy, a ninth harmonic is also superimposed on the antenna directivity pattern producing a 135 hertz amplitude modulation. This will be present at the receiver at phase coherence with the 15 hertz modulation described above and permits making a finer determination of bearing in a manner similar to that used in two speed servo systems.

To measure range the aircraft transmits an inquiry to the ground station and determines the range by using the time interval of a reply to its inquiry. Many extranious transmissions such as replies to other aircraft and the providing of other functions are also made by the ground station (approximately 2700/sec). The range pulses are the same pulses used for determining bearing. In other words only one set of pulses is transmitted by the ground station with the bearing information being imposed thereon through amplitude modulation and the range information by the time interval between a reply and its inquiry. The total pulses which the aircraft will receive will include all replies, i.e., replies from its own interrogations and replies to interrogations from other aircraft. In addition, within the total number of pulses, will be the coded reference pulses and additional pulses which are randomly added by the ground station to achieve the desired number of pulses necessary for the system to operate properly i.e. approximately 2700/sec. Out of all these received pulses, the aircraft must be capable of identifying the reply to its own interrogation by corrolation over a number of inquiries. Generally, during the initial acquisition mode, a high inquiry rate of approximately 150 inquiries per second is used to speed up acquisition. Thereafter, a tracking mode is entered with a reduced inquiry rate which is less than thirty per second. During the acquisition mode, a conventional Tacan distance measuring equipment (DME) system employs slow scan with scans from zero towards a maximum range and takes typically 10 seconds.

Most prior art systems for processing Tacan systems have been of an analog nature and have been quite costly, due to the complexity of the equipment. This is particularly true of the equipment necessary to determine bearing. Because of this high cost, most commercial airlines have elected to use the less complex VOR equipment for bearing along with a Tacan DME.

Thus, it can be seen that there is a need for less expensive, accurate and faster operating Tacan equipment which can be universally used in both military and commercial aircraft.

SUMMARY OF THE INVENTION

The Tacan signal processor of the present invention provides a novel optimum signal processor which can be implemented using a few custom made MOS/LSI chips and/or can be implemented using an existing general purpose computer already installed on an aircraft along with special purpose computing circuits. The system employs the technique of a least square recursive (Kalman) filter to update the current bearing estimates in an optimum way with each new data input. In performing the bearing computation, a simple Kalman filter provides a continuous estimate of the reference frequency $w$ and the reference phase $\theta$. A second Kalman filter acting as a bearing signal tracker accepts amplitude data, data from the first filter and, also, the time of arrival of each bearing pulse and updates five state variables related to the amplitude and phase of the 15 and 135 hertz modulations and a d-c amplitude component which gives the average amplitude of the modulated bearing pulses. Finally, a bearing computer uses the outputs of the bearing signal tracker and the reference phase tracker to compute the final bearing to be displayed to the pilot.

The use of the digital processing techniques of the present invention allows a shorter acquisition time, improved bearing accuracy at low signal to noise levels, automatic signal to noise monitoring, and improved integration and sharing of hardware with other equipment such as for Time Frequency Ranging Communications.

The implementation of the range function permits scanning all ranges simultaneously and the acquisition to be completed in well under a second. During this acquisition phase, a coarse range estimate to a specific tolerance in miles is made with a minimum number of interrogations. To accomplish this, the maximum allowable range designated Rmax (normally Rmax equals approximately 300 miles) is partitioned and completely covered by equal intervals or "bins" which are preselected as W miles wide. During acquisition, a record is maintained of the total number F of range pulses which have occurred in each bin and this record is updated after every new interrogation. The contents of the range bin corresponding to the aircraft range will increase by one count after each inquiry but all others will grow more slowly as determined by the random occurrence of the extraneous pulses received. Analysis has shown that with the range divided into 128 bins each 2.3 miles wide, each bin will accumulate less than nine extraneous pulses in 20 inquiries. During the same time interval, the correct range bin will increase one count after each inquiry except for occasional lost pulses. Allowing for a conservative 20% loss, the proper bin should accumulate at least 16 pulses for each 20 inquiries. Using this data, a number of decisions can be made to determine which bin corresponds to the proper range. To avoid problems of falling on the line between two bins, the number of bins can be doubled to provide overlapping bins.

Once the course range has been determined within the tolerance of plus or minus W/2, fine tracking commences to improve accuracy and achieve and maintain a required accuracy of better than 0.1 mile. Here again a simple Kalman filter of two state variables, range and range rate is used.

The digital range tracking portion of the system provides improved speed of acquisition, fewer ground station interrogations (thus permitting higher traffic density) and, increased accuracy through the Kalman filtering. The method can be implemented using an existing general purpose computer along with some special purpose elements in conjunction with other functions at a small additional computer burden or can be completely implemented in hardware using one or two cards of custom digital circuitry.

DETAILED DESCRIPTION OF THE PREFERRED EMBODIMENT

Figure 1:
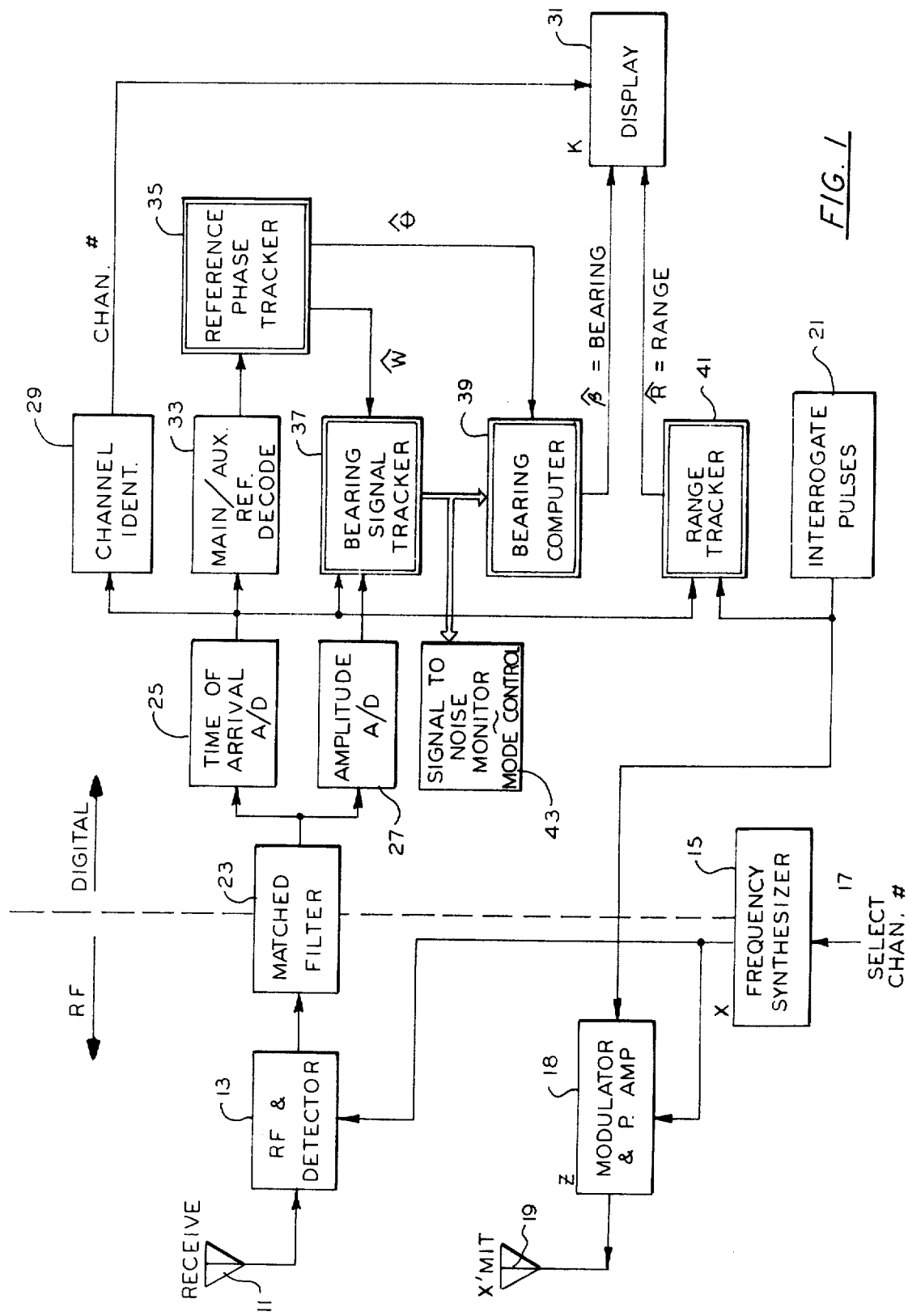
FIG. 1 is a block diagram of the Digital Tacan system of the present invention.

An overall block diagram of the digital Tacan system is shown on FIG. 1. Bearing information transmitted from the ground station which will contain the 15 hertz, 135 hertz and reference pulse information described above is received by a conventional receiving antenna 11 and provided to an RF and detector stage 13. RF and detector stage 13 has an input from a frequency synthesizer 15 which will output a frequency dependent upon the Tacan channel selected by a channel select input 17. Frequency synthesizer 15 will also provide an input to a modulator and amplifier 18 which has its output connected to a transmitting antenna 19. This is the transmitter used to transmit the interrogation pulses used in determining range. The pulses for interrogating are developed in a pulse generator 21. The output of RF and detector stage 13 is provided to a matched filter 23. These portions of the system are identical to those found in a conventional Tacan system and will not be discussed in detail further herein. It should be noted however, that the filter 23 can be constructed as a digital matched filter using conventional techniques if desired.

The output of the filter 23 is provided to a first analog digital coverter 25 where the information is encoded to provide a time of arrival output. This may simply be a high frequency oscillator or clock and counter. The counter will count the number of clock pulses between Tacan reference pulses. Each time a new pulse is received the oscillator counter output will be gated out and the counter reset. This will give the $\Delta t$ between pulses which is the quantity of interest as will be seen below. The signal from filter 23 is also provided to a second analog to digital converter 27 which encodes its amplitude. This converter will be of the type which senses amplitude such as a peak detector along with a conventional analog to digital converter, i.e., it will sample, hold and convert the amplitude of each pulse received. The Tacan ground station also transmits a code group which is channel identification. This is decoded by conventional means 29 and provided to the pilot display 31.

The time of arrival information is provided through a reference decoder 33 to the reference phase tracker 35. The ground station sends a series of coded pulses to identify the reference phase. Block 33 contains conventional decoding circuits to sense this code and provide an output each time it occurs. This may also be a $\Delta t$ output, i.e., time between reference pulses, as described above for the time of arrival output. Phase tracker 35 is a Kalman filter to be described in more detail below. The reference phase tracker 35 provides a continuous best estimate of the reference frequency $w$ and the phase $\theta$. The $w$ output is provided along with the amplitude output of block 27 to a bearing signal tracker 37 which will also be a Kalman filter. In the bearing signal tracker 37, this data is used to update five state variables related to the amplitude and phase of the 15 and 135 hertz modulation and a d-c amplitude component. The outputs of the bearing signal tracker are provided to a bearing computer 39 where they are used with the phase information from reference phase tracker 35 to compute a final bearing output which is provided to the display 31.

Time of arrival information is also provided to the range tracker 41. Provided as second input to tracker 41 are the interrogation pulses. Tracker 41 uses these inputs to determine the range in a manner to be described below. The final output is then also provided to the display 31. Another output from the bearing signal tracker 37 is provided to a signal to noise monitor 43.

At this point it might be well to provide a very basic explanation of the Kalman filtering technique. In essense, it can be considered to be a method of determining a weighted average of a number of data measurements. Consider the problem of measuring a voltage using two separate voltmeters. The voltage out of first meter may be designated $V_1$ and that out of the second meter as $V_2$. The average voltage $V$ could be set equal to the voltage $V_1$ times a weighting factor L, plus the voltage $V_2$ times another weighting factor, K, divided by the sum of the weighting factors. (The weighting factor would of course be related to the relative accuracy or deviation of the two meters.) If the sum of the weighting factors is made equal to one, the division is no longer necessary. The resulting equation will be $\hat{V} = LV_1 + KV_2$, where the hat over $V$ indicates an estimated value. In the Kalman technique what is essentially done is to determine the value of $K$ in the above equation. Knowing $K$ it is then possible to determine $L$, $L$ being one minus $K$. As applied in the present system, the two measurements are measurements which occur at different times rather than inputs from separate instruments. The Kalman filtering of the present invention keeps an estimate of the value being measured between measurements and uses this estimate value along with a new measured value in an equation similar to that above to come up with a new estimate. To keep the estimate current between measurements, a model of the system is used. Thus, the systems keeps track of two quantities; one designated as X is the quantity which is being measured, the other designated P and termed the variance is a measure of the error or unreliability of the estimated value and can be used to compute K shown as the Kalman gain.

Consider the above equation when used to estimate the voltage from two readings made at different times. $V_1$ is now $V(t_1)$ and $V_2$ now $V(t_2)$ where $t_1$ is the time of the first measurement and $t_2$ the time of the second the equation becomes $V = LV(t_1) + KV(t_2)$, the estimated value at $t_1$ being now used to obtain the new estimate. This example assumed a fixed voltage and a random observation error. Now consider the measurement of a changing value such as the distance or range $R$ to a moving vehicle, moving in a straight line away from the observer. This computation which would be done is represented by $\hat{R} = LR_2 + K\hat{R}_1$. If measurements are close in time this equation will work well with proper weighting. But if measurements are far apart in time it is helpful to provide a better value of $\hat{R}_1$. This may be done by using both range and range rate. In the Kalman equations, this would be expressed in matrix form as $$\hat{x} = \begin{bmatrix} x_1 \\ x_2 \end{bmatrix}$$

where $X_1$ = Range and $X_2$ = Range Rate. $X_1$ and $X_2$ are the state variables of the vector represented by $\hat{X}$. Now if $\hat{X}(t_1)$ is measured at time $t_1$ a current value of $\hat{X}(t_n)$ at time $t_n$ may be computed through the estimated range rate $X_2$ and $t_n - t_1 = \Delta t$ i.e. $R(t_n) = R(t_1) +$ (range rate) $\Delta t$. Now a $R(t_n)$ which is updated in the equation $\hat{R} = LR(t_n) + KR(t_n)$ may be used to provide a more accurate estimate. The computation to find the current range is where the system/model comes in. In this sample system our model for range is the well known relationship between velocity, time and distance. Similar known models are used in the Tacan system as will be evident below. Further details as to system models and the deviations of the various equations are given in the appendix. The value $\hat{P}$ for the two dimensional case becomes a matrix, the covariance matrix, instead of the previous scalar variance. Note that in computing $\hat{P}$, the co-variance, similar matricies are used, e.g., where in the present example $$P = \begin{bmatrix} P_1 & P_3 \\ P_3 & P_2 \end{bmatrix}$$

where $P_1$ and $P_2$ relate to the badness or deviation of $X_1$ and $X_2$ respectively (the quality of the range and range rate estimates,) and $P_3$ is a measure of the correlation between $X_1$ and $X_2$.

The Kalman filtering technique is described in detail by R. E. Kalman in "A new Approach to Linear Filtering and Prediction Problems", Journal of Basic Engineering March 1960, page 35 and by R. E. Kalman and R. S. Bucy in "New Results in Linear Filtering and Prediction Theory", Journal of Basic Engineering, March 1961 page 95.

Figure 2:
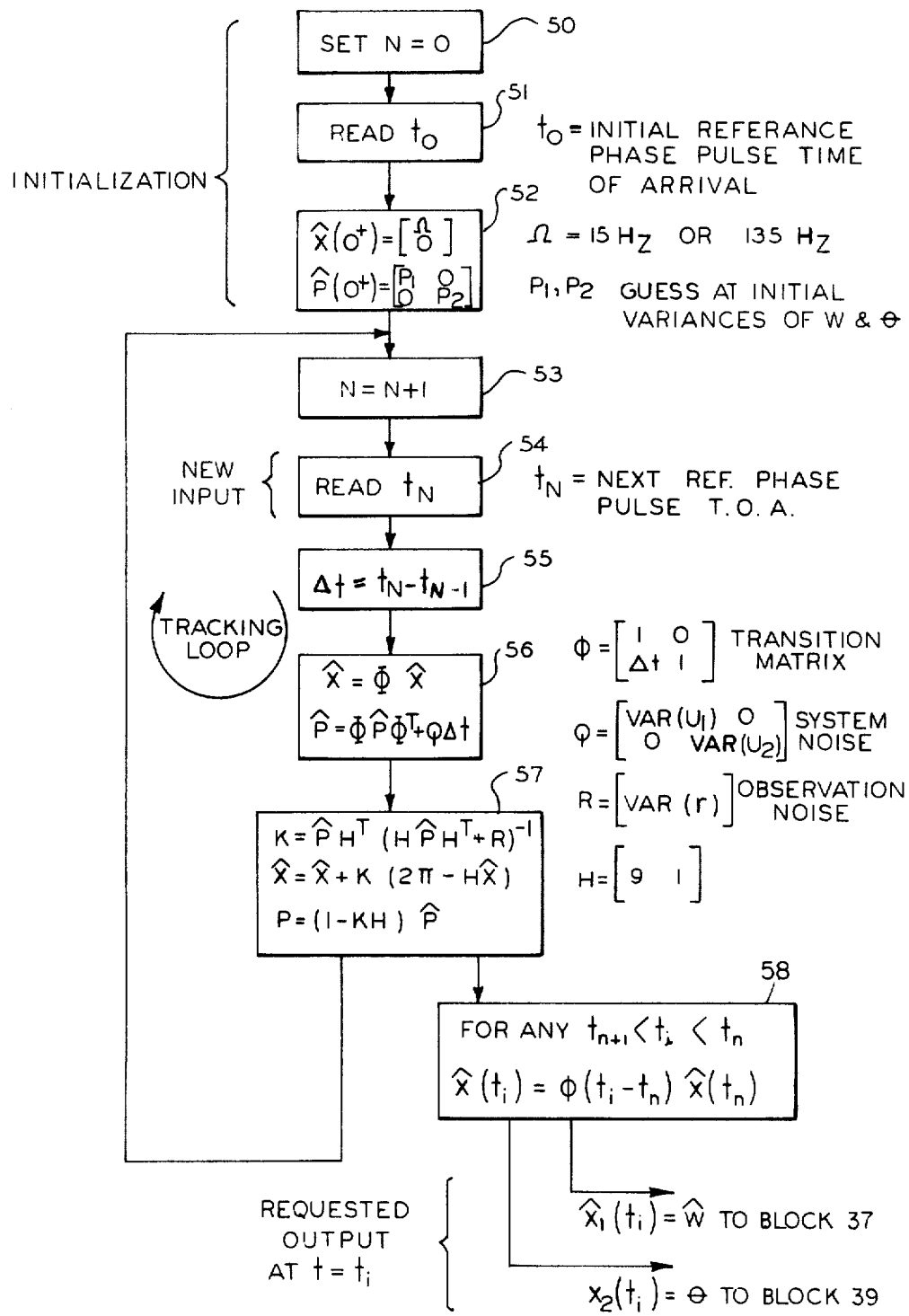
FIG. 2 is a flow diagram illustrating the operation of the reference phase tracker of FIG. 1.

FIG. 2 is a flow diagram illustrating the operation of the reference phase tracker 35 of FIG. 1. As shown in FIG. 2, the system is first initialized by setting N, a variable which represents the number of reference pulses already received, equal to zero as indicated by block 50. The time of receipt of a reference pulse, $t_0$, is then read as indicated by block 51. For purposes of this calculation, the variables X and P are defined to be:

$$X(k) = \begin{bmatrix} \omega \\ \theta \end{bmatrix} \quad P(t) = \begin{bmatrix} P_1 & P_3 \\ P_3 & P_2 \end{bmatrix}$$

where $\omega$ and $\theta$ are the reference pulse frequency (i.e., number of reference pulses per second) and phase (i.e. $2\pi\omega t$ where $t$ is the elapsed time from the receipt of the peak pulse signal of the reference) respectively. The initial values of X and P are taken to be:

$$X(t0) = \begin{bmatrix} \Omega \\ 0 \end{bmatrix} \quad P(t0) = \begin{bmatrix} P_1(0) & 0 \\ 0 & P_2(0) \end{bmatrix}$$

where $\Omega$ equals either 15 or 135 hz depending upon which pulse frequency is being utilized and $P_1(0), P_2(0)$ are best guess inputs as indicated in block 52. The "hats" $\wedge$ over the values shown in block 52 are a well known notation indicating that the values are estimates. The computation then proceeds to block 53 where N is incremented by 1. The time of arrival of the next reference pulse is read as indicated by block 54. From this the measured time elapsed between pulses, is computed as indicated by block 55. (As indicated above, in actual practice $\Delta t_n$ may be supplied directly from the analog-digital time of arrival converter 25 shown in FIG. 1.) The value of the transition matrix $\phi$ and the system noise covariance matrix Q is then computed as:

$$\phi_n = \begin{bmatrix} 1 & 0 \\ \Delta t_n & 1 \end{bmatrix} \quad Q = \begin{bmatrix} \text{var}(u_1) & 0 \\ 0 & \text{var}(u_2) \end{bmatrix}$$

Updated values of $\hat{X}$ and $\hat{P}$ are then computed as:
$X(t_n) = \phi_n X(t_{n-1})$
$P(t_n) = \phi_n P(t_{n-1}) \phi_n^T + Q(t_{n-1}) \Delta t_n$ as shown in block 56 to provide a running estimate of phase and frequency and their variances in accordance with the system model that phase is frequency multiplied by time. A vector K, the Kalman gain, is computed as:
$K = P(t_n) H^T (HP(t_n)H^T + R)^{-1}$
where $H$ is the row vector [0] and R the observation noise, var (r). From this value of K, as shown in block 57, new values of $\hat{X}(t_n)$ and $\hat{P}(t_n)$ are computed. The equations shown in block 57 are essentially identical to the simple equations described above to accomplish weighing. Consider what has happened here; the antenna has completed a revolution as indicated by a pulse. Thus, the new phase may be said to represent a measurement of $2\pi$. Returning to the equation of page 9, line 9
where
$X_2 = (I-K_2)X_2(t_1) + K_2X_2(t_2) = X_2(t_1) + X_2(\text{New}) = (I-K_2) X_2(\text{Predicted}) + K_2X_2(\text{Measured})$
Substituting we have with
$X_2$ (Measured) = $2\pi$
$X_2$(New) = $(I-K_2)X_2$(Predicted) + $2\pi K_2$ or
$X_2$(New) = $X_2$(Pred) + $K_2(2\pi - X_2$(Pred)) = $X_2$(Pred) + $K_2(2\pi - HX$(Pred))
where the $H$ matrix [0, 1] must be included to transform the vector X back to the same form as the $2\pi$ i.e., to project the phase. A similar expression can be written for $X_1$ and to get this in matrix form these become the second equation in block 57, the computation of P follows in similar fashion. This is all done in the block 57 and the outputs therefrom then provided back to block 53. This is the tracking loop and, each time through this loop, new values of $\hat{X}$ and $\hat{P}$ will be computed and used in maintaining a current estimate. For any pulse at a time $t_i$ between $t_{n+1}$ and $t_n$, as shown in block 58, $X(t_i)$ will equal the quantity shown. (Remember $$X = \begin{bmatrix} X_1 \\ X_2 \end{bmatrix}$$

and thus, $X1$ and $X2$ will be available to provide the $\dot{\omega}$ and $\dot{\theta}$ outputs to blocks of FIG. 1.

Figure 3:
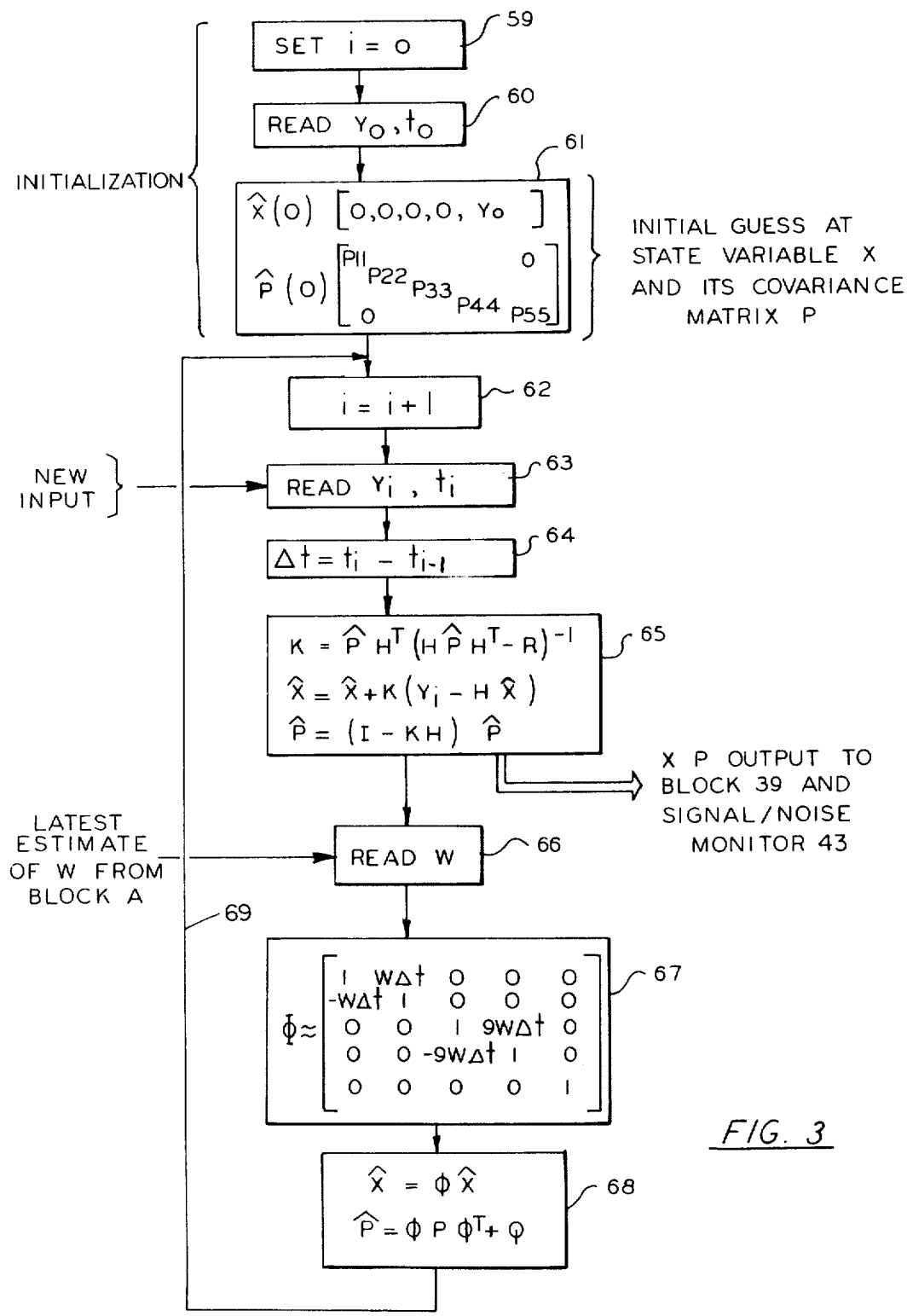
FIG. 3 is a flow diagram of the operation of the bearing signal tracker of FIG 1.

FIG. 3 illustrates in flow diagram form, the operations which take place in the bearing signal tracker 37 of FIG. 1. The system is initialized by setting $i$ equal to zero in block 59 and then reading the signal amplitude $y_0$ and its arrival time $t_0$ in block 60. These are then used to compute initial values of $\hat{X}(0)$ and $\hat{P}(0)$ in block 61. Here X is a function of five state variables. These arise from the 15Hz phase and amplitude 2, 135 Hz bearing phase and amplitude 2, and DC component 1 giving the mean amplitude. Similarly, the covariance matrix P 0 will have five non-zero quantities in it corresponding to the variance of each of these quantities. For each iteration, $i$ is increased by one as indicated in block 62 and new values of the amplitude $y$ and the time of arrival $t_i$ of received pulses are read in, as indicated by block 63. In block 64 $\Delta t_n$ equal to $t_i$ minus $t_{i-1}$, is then computed. (Again, $\Delta t$ will generally be provided directly as directed above.) The values k, $\hat{X}$ and $\hat{P}$ are computed in block 65 in the manner described above. [Block 65 correspondents to block 57 of FIG. 2 and blocks 67 and 68 to block 56. The order of these two computations does not particularly matter since in both cases the loop is closed.] The estimated old values used in block 65 will have been obtained from block 68. The outputs herefrom are provided to the bearing computer 39 and the signal to noise monitor 43. At this point, a new $\omega$ from the reference phase tracker 35 is obtained as indicated by block 66 and a matrix computation performed as shown by block 67. $\theta$ is continually computed using $\omega$ and $\Delta t$ between pulses to keep current the estimates of block 68. The matrix shown is in an approximate form. The exact matrix would include sine and cosine functions in the appendix. (Here because of small angles sin $\omega$ is assumed to be $\omega$ and cos $\omega$ to be 1.) From the value of $\theta$ computed therein the updated value of $\hat{X}$ and $\hat{P}$ is computed in the block 68 and then provided through the tracking loop 69 and back to block 62.

The computations shown hereon in blocks 65, 67 and 68 are the ones which consume the most time. Computer simulation has shown that the value of the nonzero components of K will initially be large, due to the inaccuracy of the initial estimates but will quickly reach a limit which is a constant. It then becomes possible to supply the constant components of K (or to supply them as a series of step values to speed up the settling process) and still acquire the bearing signal in a reasonably short time. Thus, the K computation in block 65 and the P computations in blocks 61, 65 and 68 may all be eliminated to substantially reduce the amount of computation needed. The remaining time consuming computation is that of blocks 65 and 68. As is evident, a large number of matrix multiplications are required and must be a number of times for each of the approximately 2700 pulses if accuracy is to be maintained. This is beyond the capability of most airborne general purpose digital computers. Thus, as will be described below, special purpose computing hardware is provided to perform these computations.

Figure 4:
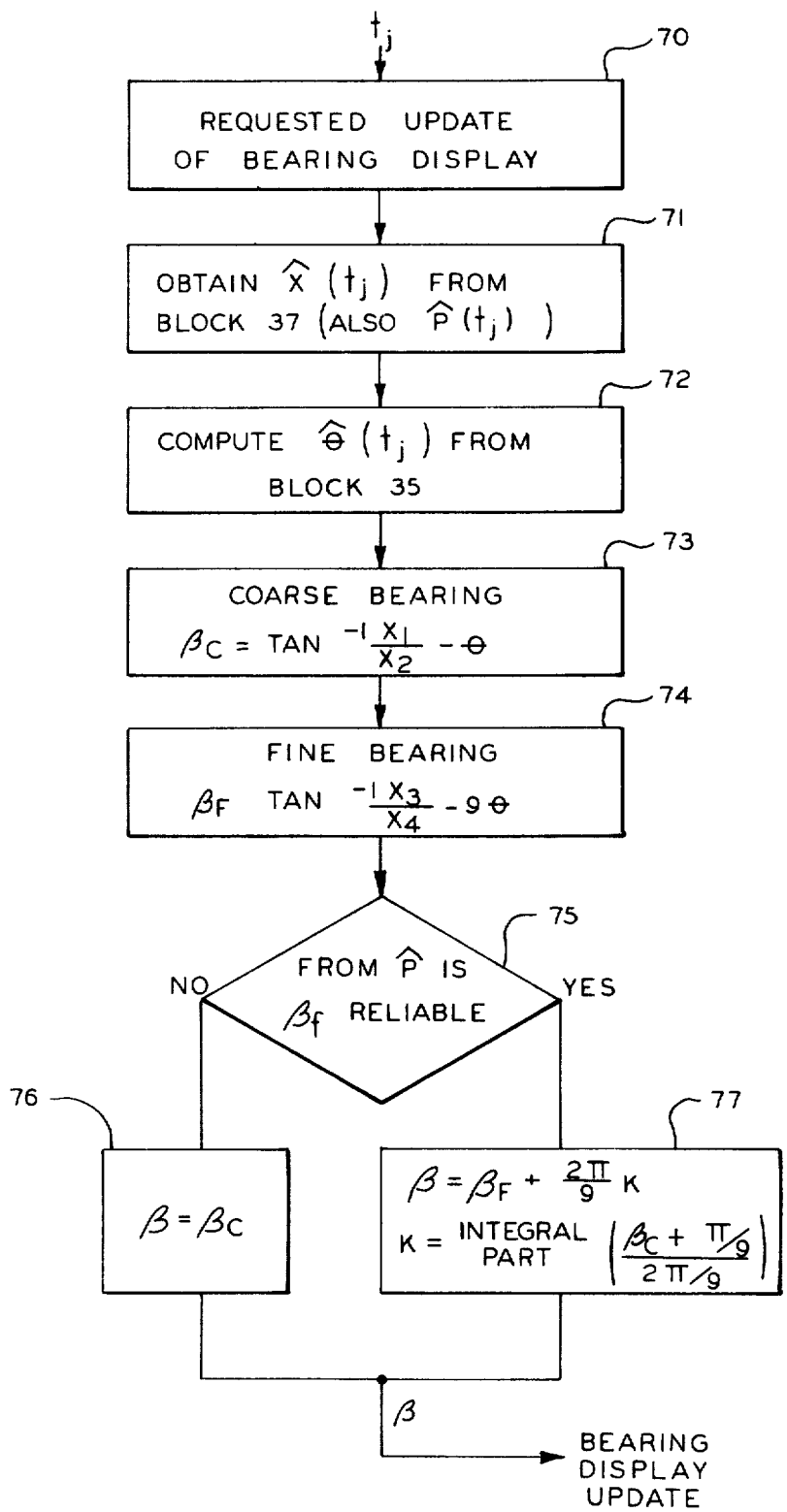
FIG. 4 is a flow diagram illustrating the bearing computation of FIG. 1.

The bearing computation of block 39 is shown in flow diagram form on FIG. 4. At the time of a requested update of the bearing display as indicated by block 70, a new value of time $t_j$ is input. The value $\hat{X}$ $(t_j)$ and $\hat{P}$ $(t_j)$ is then obtained from the bearing signal tracker 37. If the P computation is eliminated as described above, the $\hat{P}$ $(t_j)$ value will not be used. In block 71, the value $\theta$ $(t_j)$ is then obtained from the reference phase tracker 35 as indicated by block 72. From the state variables of $\hat{X}$, the coarse and fine bearings are computed as indicated by blocks 73 and 74. A check is then made in block 75 using $\hat{P}$ to see if the fine bearing is reliable. If $\hat{P}$ is not computed the decision to use or not to use fine bearing may be based on elapsed time from the start of computation. If the fine bearing is not reliable, then the bearing is set equal to the coarse bearing as indicated by block 76 and provided as an output to the display. If the fine bearing is reliable, the computation indicated in block 77 is performed which combines the coarse and fine bearings to obtain a final bearing output to be displayed.

Figure 5:
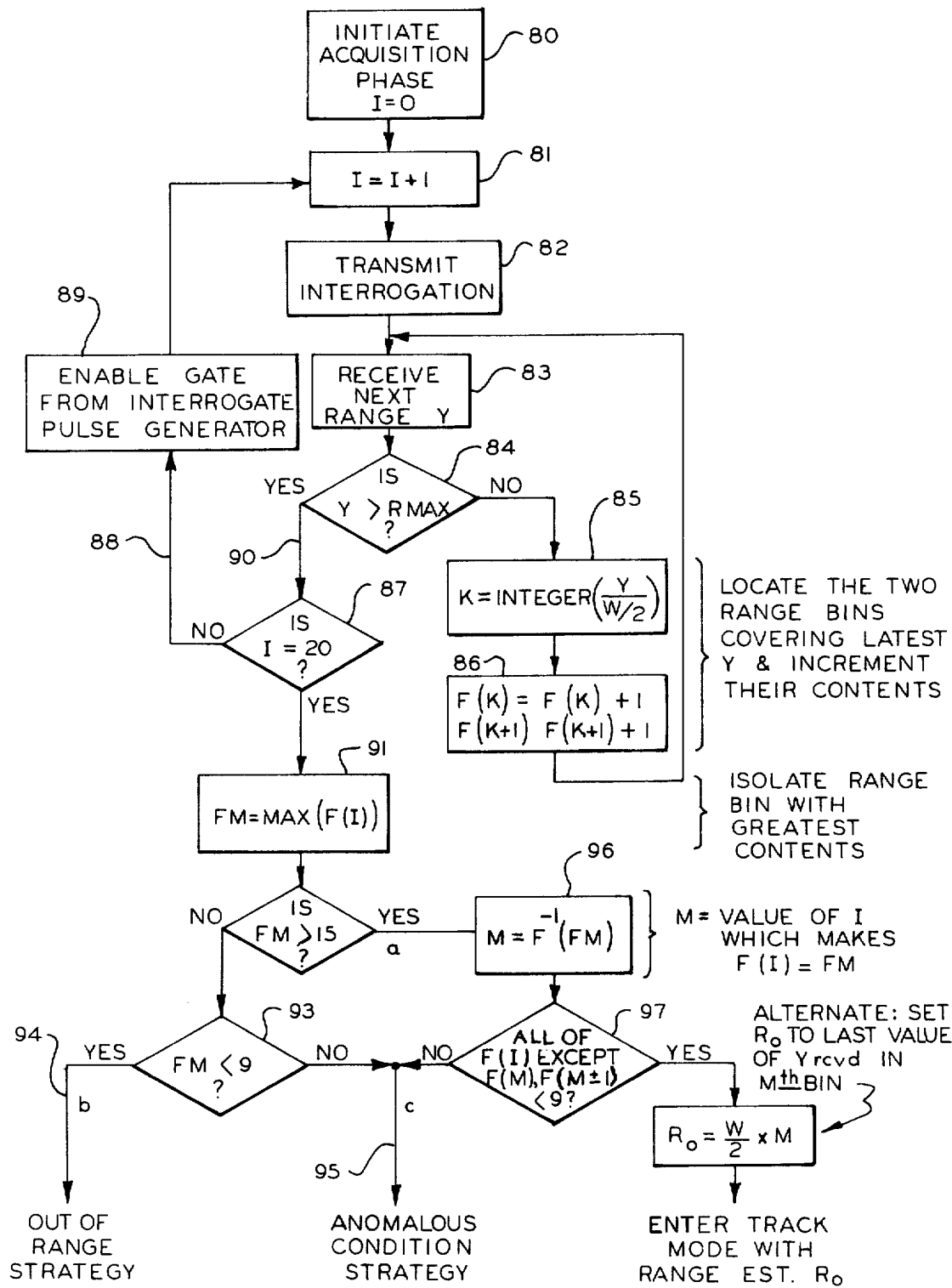
FIG. 5 is a flow diagram illustrating operation of the range portion of the system in the range acquisition mode.

Operation in the range acquisition mode is illustrated by the flow diagram of FIG. 5. First, as indicated by block 80, the command to initiate an acquisition phase is made and the value I set to zero. In block 81, I is incremented by one and, as indicated by block 82, an interrogation pulse is transmitted. After transmission all the received pulses are provided to block 83 and a check then made in block 84 to see if R is greater than $R_{max}$. The value R will be directly related to time of arrival in a known fashion. That is to say, pulses travel at the speed of light. Thus, knowing the time of transmission of the interrogation pulse and the manner in which the ground station responds, it is only necessary to find the $\Delta t$ between transmission of the pulse the time of arrival of each received pulse, and multiply it by a constant to obtain the range, R associated with that received pulse (each pulse, at this point, is assumed to be a response to the interrogation.) Any pulses received after a time corresponding to $R_{max}$ cannot be responses. The pulses themselves may be used in this decision or alternately a timer used to indicate passage of the time associated with a responsive at maximum range. If R has not reached $R_{max}$, then block 85 is entered and a value K equal R/W/2 computed. This value K is used in block 86 to compute a value F(K) and F (K+1) which correspond to the two overlapping range bins into which the received pulse falls. These two range bins are incremented by one. The computation returns to block 83 with the system remaining in this loop and determining a range bin for each pulse until a pulse corresponding to R greater than $R_{max}$ is received indicating that the full range including all bins has been cycled through. At that point, R will be greater than $R_{max}$ and the program will enter the block 87. Here a check is made to see if I, the number of interrogation pulses, is equal to 20. If I is not equal to 20 an output on line 88 enables a gate from the interrogate pulse generator to transmit another pulse as indicated by block 89 and then goes back to block 81 to increment I by one. The system will then go through the blocks described above, i.e. blocks 82, 83, 84, 85 and 86 and will continue in these two loops until 20 interrogation pulses have been transmitted. After 20 interrogations block 84 will be exited on the line 90. At this time, 20 pulses have been sent out and each bin has gone through once for each pulse. In block 91 the value FM is set equal to the maximum F(I) i.e. the range bins are searched to see which has the most entries in it and FM set equal to the maximum number in any of the bins. A check is then made to see if FM is greater than 15. As noted above, a bin representing the proper range will have received at least 16 of the 20 interrogations. The other bins will have been randomly incremented by pulses not corresponding to responses. If FM is less than 15 a block 93 is entered to see if it is less than 9. If it is less than 9, an indication on line 94 to tell the system it is out of range is provided. If out of range, each bin will be incremented in a random fashion and none should receive more than 9 pulses in the time required to make 20 interrogations. Otherwise, i.e. if FM is between 9 and 16, an indication that anamalous condition is present is given on line 95. If FM is between 9 and 15 then something is wrong and steps must be taken to reacquire the range.

If FM is greater than 15, then block 96 is entered where M is set equal to $F^{-1}$ of FM, i.e. M is set to the bin number which accumulated the value FM therein. A check is then made in block 97 to see if all of F (I) with the exception of F(M) and F(M±1) is less than 9. Only one bin, and because of the overlapping, the bin next to it should have more than 9 in it. If no bin other than these contains more than nine, an output indicating that the proper bin has been selected is provided and the coarse range $R_0$ is set equal to W/2 X M. (The range is divided up into y bins each W/2 miles wide, i.e. if $R_{max}$ equals 300 miles and $y = 128$ then 256 overlapping bins are provided (i.e. 2 × 128 bins of 2.3 miles) then $M \times 2.3/2 = 300$ miles.) If not, an output on line 95 indicating an anamalous condition which may be used to restart the acquisition mode is provided.

Figure 6:
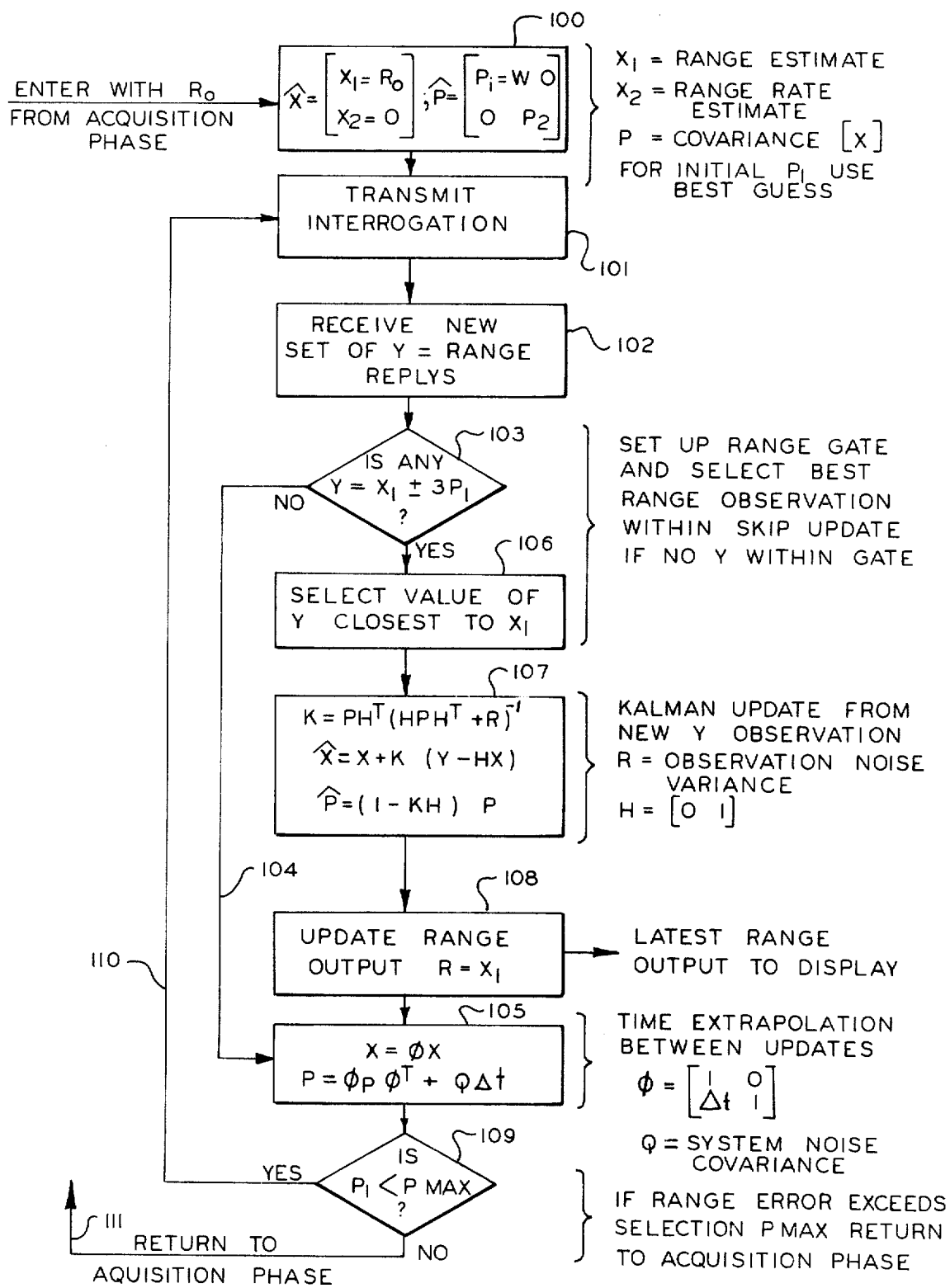
FIG. 6 is a similar diagram illustrating the tracking mode of the range portion of the system.

FIG. 6 is a flow diagram illustrating the tracking mode of the range portion of the system. The coarse range value $R_0$ is entered to block 100 and used to compute $\hat{X}$. $\hat{X}$ here has two state variables corresponding to range ($x_1$) and range rate ($x_2$). P is estimated as above. ($P_1$ is the range variance, $P_2$ the rate variance.) An interrogation is then transmitted as indicated by block 101 and a new set of R equal to range replies received as shown by block 102. A check is then made to see if any received R is equal to $X_1$ plus or minus 3θ where $X_1$ is the range estimate and θ is the standard deviation obtained from $P_1$. A range gate can be opened for a short period corresponding to the time when a reply is expected. In practice this gate may be made narrow enough to only gate reply pulses and the computation of block 103 reduced to determining the presence or absence of a pulse. If the answer is no, the block 103 is exited on line 104 and the computation goes to a block 105. If the answer is yes, block 106 is entered and the value of y closest to $X_1$ is selected. In practice this need not be done either since only one pulse will be received through the gate. A Kalman update is then performed in block 107 is the same way as described above in connection with bearing computation to obtain the values $\hat{X}$ and $\hat{P}$. The range is updated as shown by block 108 with the range R equal to $x_1$. After this block 105 is entered, the computations therein are performed either using the values of $\hat{X}$ and $\hat{P}$ from block 107 or the initial values obtain over line 104 to compute a new X and P using the value $\phi$ obtained from the matrix shown and Q which is the system noise covariance. This provides the constant updating of the system between pulses. A check is then made to see if $P_1$ is less than $P_{max}$, an established value. If it is, then the block 109 is exited on line 110 back to block 101 causing another interrogation to be transmitted. As long as $P_1$ is less than $P_{max}$, the system will stay in this tracking loop. If $P_1$ does not stay less than $P_{max}$, the block 109 will be exited on line 111 and cause the system to return to the acquisition phase.

Figure 7:
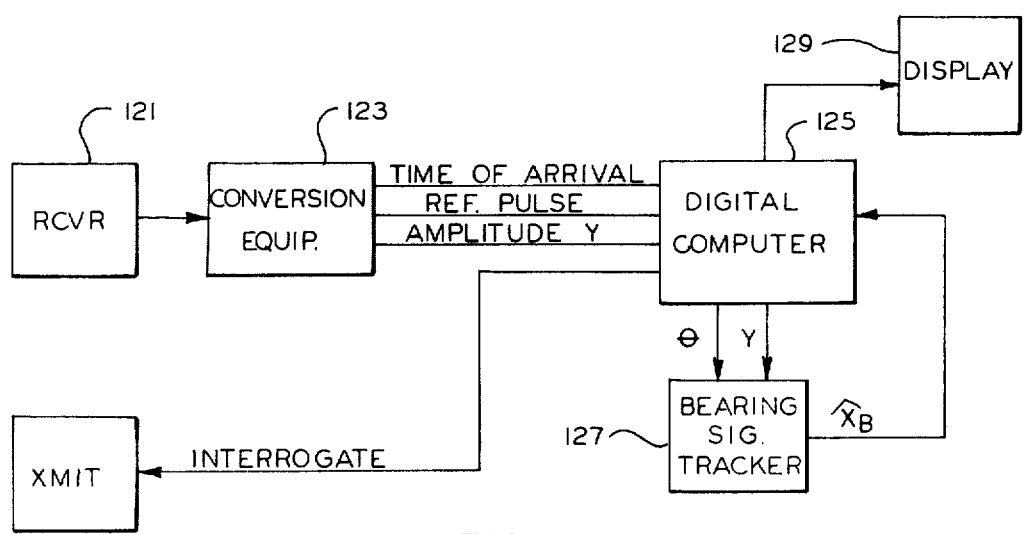
FIG. 7 is a basic block diagram of the computing hardware portion of the system.

A block diagram of the basic hardware arrangement is shown in FIG. 7. The input pulses are received by the receiver 121 described above and provided to the conversion equipment 123 wherein the time of arrival of the pulses, an indication of the reference pulse and an amplitude signal Y will be provided as outputs in the manner described above. The computation associated with FIGS. 2, 4, 5 and 6 will be performed within a digital computer 125. The bearing signal tracker module 127 will comprise special purpose computing hardware to be described below. The bearing signal tracker 127 will obtain outputs θ and y from digital computer 125 and use these to compute $\hat{X}$ which is then provided back to the computer 125 for use and computations of the bearing outputs of FIG. 4. The bearing and range outputs obtained in digital computer 125 are then provided to the pilots display 129.

Figure 8:
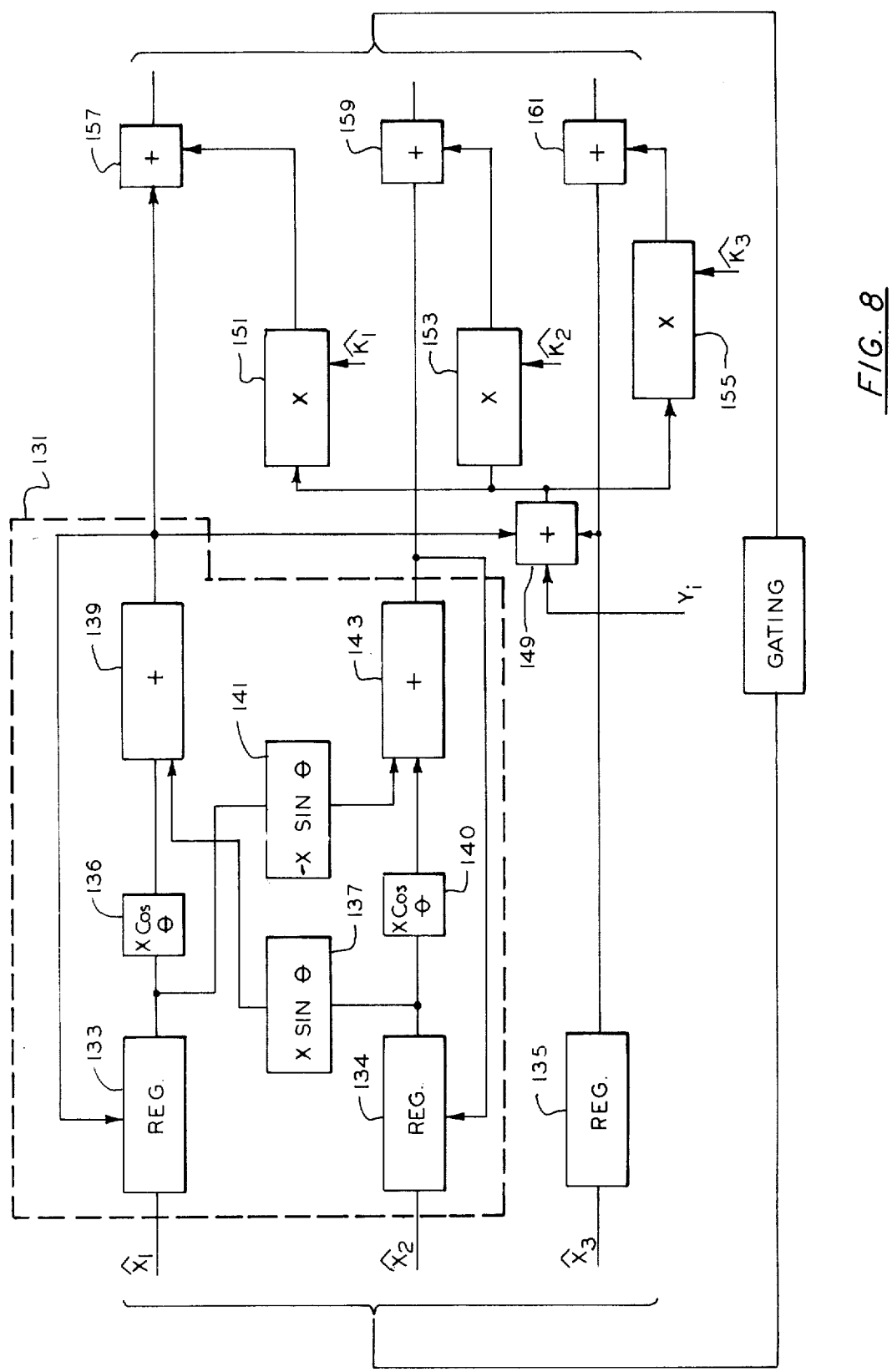
FIG. 8 is a block diagram illustrating the implementation of the matrix multiplication indicated on FIG. 3.
Figure 10:
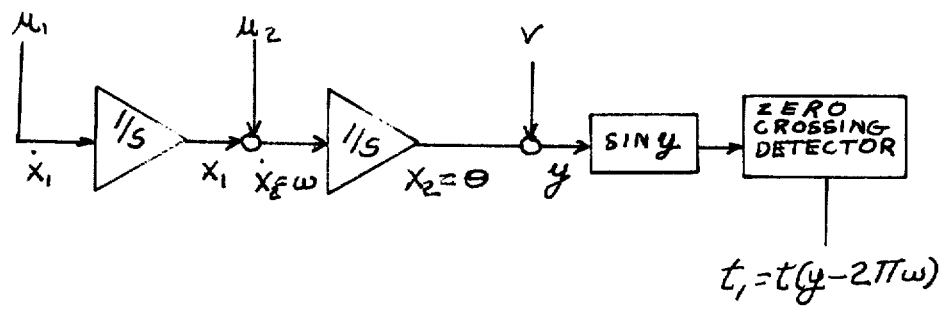
FIG. 10 is a system model of the reference phase tracker.
Figure 11:
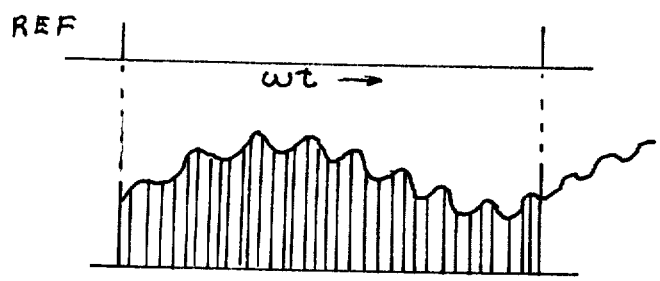
FIG. 11 is a diagram illustrating the received signal at the varying tracker.
Figure 12:
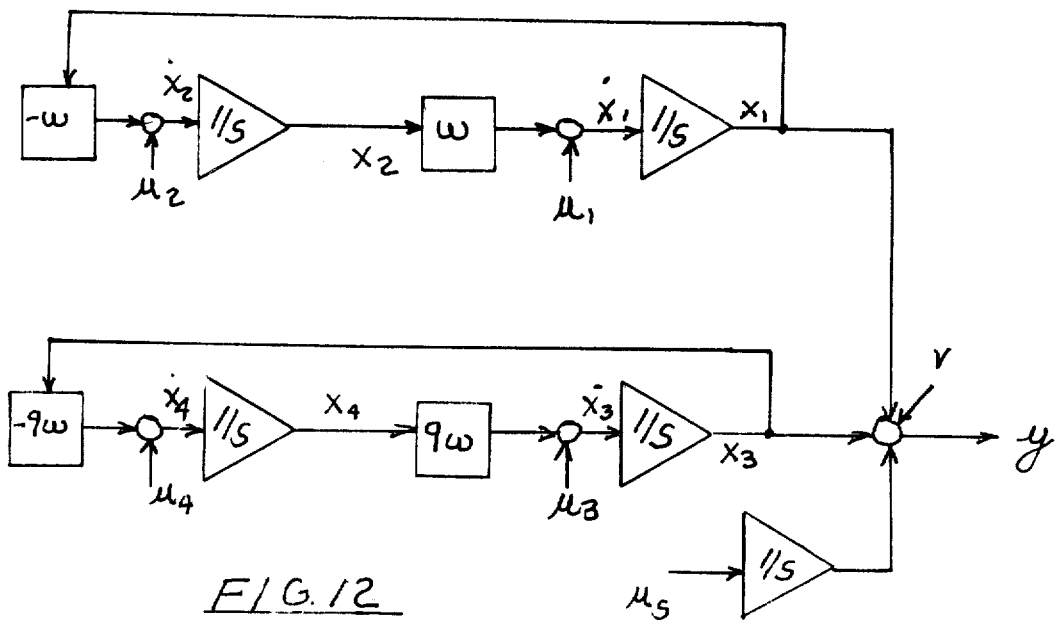
FIG. 12 is a system model for the varying signal.

The bearing signal tracker 127 of FIG. 7 is shown in schematic form on FIG. 8. The hardware of FIG. 8 uses conventional digital computing elements such as adders, registers, and multipliers which are shown only in schematic form and will not be described in detail herein. The computation shown thereon is only shown for the coarse bearing in order to simplify the figure. Similar computations would also be made for the fine bearing.

The heart of the system is the portion shown in dotted lines and indicated as block 131. Herein the matrix multiplications of blocks 67 and 68 of FIG. 3 are performed. After a new input is received the values of $\hat{X}_1$, $\hat{X}_2$ and $\hat{X}_3$ which are computed in a manner to be described below are loaded into the respective registers 133, 134 and 135. $\hat{X}_3$ is the DC component and will simply be stored in the register 135 until a new update is required. The values of $X_1$ and $X_2$ however, must be incremented to maintain an estimate of the phase and frequency. Values of pulse updates are obtained approximately every 300 microseconds. The computation in block 131 is updated approximately every 90 microseconds. This requires adding 0.5° increment to the angle during each update. In performing the update the value in register 133 is provided to a block 136 where it is multiplied by cosine theta where theta is the angle of rotation i.e. 0.5°. Since for a small angle such as this the cosine is approximately 1, block 136 can actually be eliminated and the cosine approximately as being 1. The ouput of register 134 is provided to a block 137 where it is multiplied by the sine of theta. In actual practice the multiplication may be done by shifting. The values after multiplication are then provided to an adder block 139 where they are added together and then provided back to register 133. In similar fashion, the output of register 133 is multiplied by cosine theta in block 140 and the output of register 133 by sine theta in block 141 whereupon the two values are added in an adder 143 and provided back to the register 134.

Thus, between updates the values in registers 133 and 134 will be continually incremented to provide a best estimate of the state variables. When a new $y_1$ input is obtained, it is provided into an adder 149 where it has subtracted from it the value in register 133. This will be the updated value and, depending on the particular hardware design may be provided out of the adder 139 or alternatively from the register 133. It also has substracted from it the values stored in register 135. This develops the value Y - HX shown in block 65 of FIG. 3. This value is then provided to three multipliers numbered respectively 151, 153 and 155. Here it is multiplied by the Kalman gains indicated as $\hat{K}_1$, $\hat{K}_2$ and $\hat{K}_3$. As mentioned above, these Kalman gains can be constants. Preferably, they will be powers of 2 so that the multiplications indicated in blocks 151, 153 and 155 can be done in a simple manner by shifting, in which case blocks 151, 153 and 155 can be registers. The multiplier outputs are then added in the respective adders 157, 159 and 161 to the estimated values of $\hat{X}_1$, $\hat{X}_2$ and $\hat{X}_3$ to provide the final update value. This corresponds to the second equation in block 65 of FIG. 3. These outputs are then used to update the registers 133, 134 and 135 and will also be provided as outputs to the digital computer 125 of FIG. 7. Preferably, the operations shown on FIG. 8 will be implemented with serial arithmetic to minimize hardware but still obtain the necessary speed.

Figure 9:
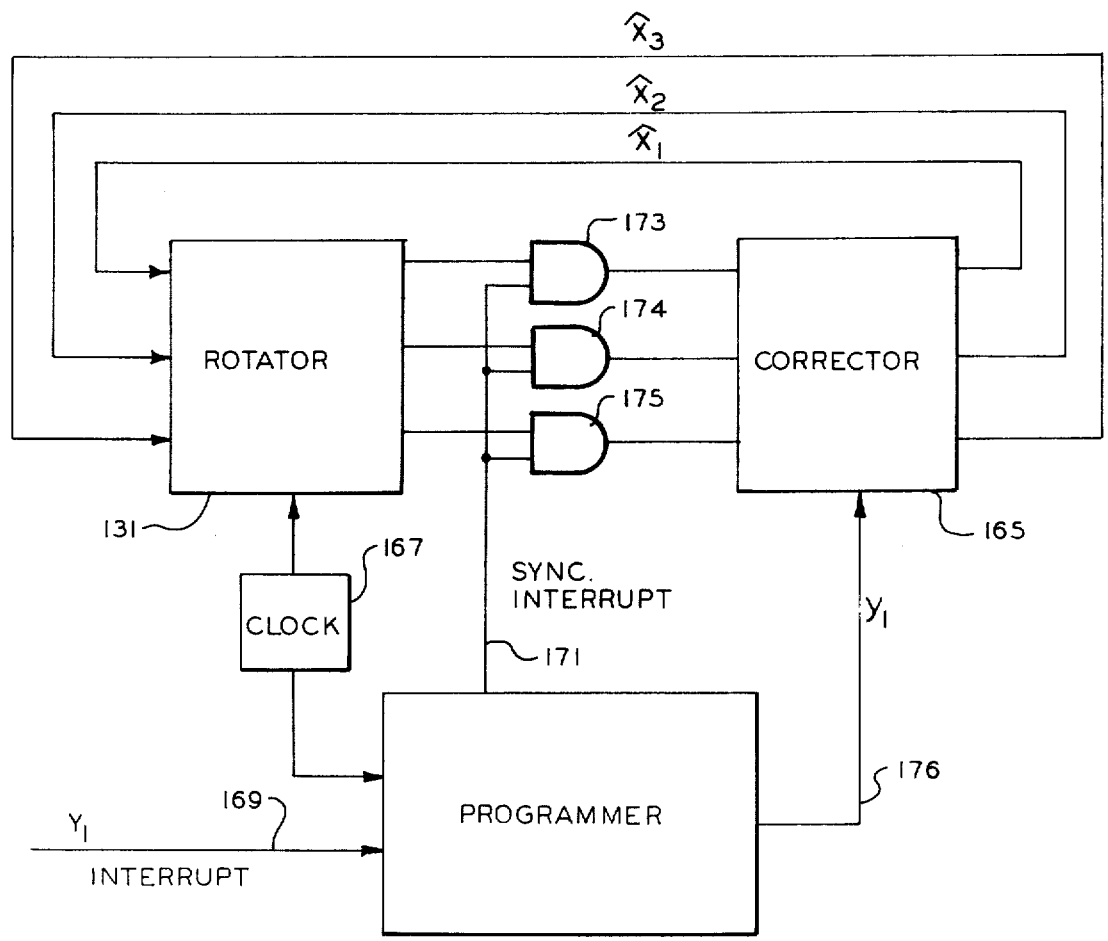
FIG. 9 is a block-logic diagram illustrating the control of the computations associated with FIG. 8.

FIG. 9 illustrates in block diagram form the control of the computations associated with FIG. 8. The rotator 131 is shown with the remainder of the computation hardware of FIG. 8 indicated by a block 165 designated a corrector. Once new data is loaded into the registers of FIG. 8, a clock 167 provides inputs to the register to cause the vector rotation to be carried out as described above. This rotation continues until a new $y_1$ value is obtained as evidenced by a $y_1$ interrupt on line 169. To avoid breaking off the rotation computation in the middle, nothing further is done until the clock output indicates that this computation is finished. Thereupon an input is provided on line 171 to a group of AND gates designated 173, 174 and 175 and the new value provided out on line 176. In response to these signals, the values in block 131 are gated into the corrector 165 where the additions and multiplications described above in connection with FIG. 8 are performed and the new values immediately fed back into the rotator to update the registers therein. The rotation then continues in response to the outputs of clock 167.

Thus, an improved digital tacan system which makes use of the Kalman filtering technique has been shown. Although a specific embodiment has been illustrated and described, it will be obvious to those skilled in the art that various modifications may be made without departing from the spirit of the invention which is intended to be limited solely by the appended claims.

What is claimed is:

1. Apparatus to receive and decode a Tacan bearing signal comprising:
   a. an antenna;
   b. an RF and detector stage coupled to said antenna;
   c. a matched filter having the output of said RF and detector as an input;
   d. means coupled to the output of said filter to detect the time arrival of each signal pulse and to provide an output indicative thereof;
   e. means to detect the amplitude of each signal pulse and to provide an output indicative thereof;
   f. means coupled to the output of said filter to detect the time of arrival of a reference pulse and to provide an output indicative thereof; and
   g. digital computing apparatus having as inputs the output of said means to detect the time of arrival of each signal pulse, means to detect the amplitude of each signal pulse and means to detect the time of arrival of a reference pulse, said digital computing means programmed to:
      1. compute from the time of arrival of said reference pulses using a first Kalman Filter, the estimated frequency and phase of the transmitted signal;
      2. compute from the frequency, the amplitude and the estimated frequency, using a second Kalman Filter, an estimate of the state variables of the bearing signal; and
      3. compute from said state variables and the estimated phase, the bearing of the receiver with respect to the transmitting station.

2. The invention according to claim 1 wherein said digital computing means comprise a programmed digital computer implementing said first Kalman Filter and to compute the bearing of the transmitting station a special purpose computing circuit interconnected therewith to implement said second Kalman Filter.

3. The invention according to claim 1 wherein said digital computing means include means to compute range.

4. The invention according to claim 3 and further including:
   a. a transmitting antenna;
   b. means to transmit a plurality of interrogation pulses via said antenna; and
   c. wherein said digital computing means are further programmed to:
      1. divide the maximum range into increments and assign a range bin to each increments;
      2. between transmissions using the time of arrival of each received pulse to increment the bin corresponding to the range for that time of arrival;
      3. after a predetermined number of interrogation pulses are transmitted, examine the bins and select the one with the most entries as the estimated range;
      4. reduce the interrogation rate;
      5. use said estimated range as the initial value in a third Kalman Filter along with responses from subsequent interrogation pulses to maintain a current range estimate.

5. The invention according to claim 4 wherein said digital computing means are further programmed to compare the covariance of said third Kalman Filter with a predetermined value and to provide an output indicating the need for reacquisition when said value is exceeded.

6. A method of determining a Tacan bearing comprising:
   a. receiving the Tacan pulses transmitted by a Tacan station;
   b. determining the time of arrival of each pulse and its amplitude;
   c. determining the time of arrival of each reference pulse;
   d. computing from the time of arrival of said reference pulses in a first Kalman Filter the estimated frequency and phase of the transmitted signal;

e. computing from the frequency, the amplitude, and the estimated frequency, in a second Kalman Filter, an estimate of the state variables of the bearing signal;

f. computing, from said state variables and the estimated phase, the bearing of the receiver with respect to the transmitting station.

7. The invention according to claim 6 wherein the range to said station is also computed by steps comprising:

a. dividing the maximum range into increments and assigning a range bin to each increment;

b. between transmissions using the time of arrival of each received pulse to increment the bin corresponding to the range for that time of arrival;

c. after a predetermined number of interrogation pulses are transmitted examining the bins and selecting the one with the most entries as the estimated range;

d. reducing the interrogation rate;

e. using said estimated range as the initial value in a third Kalman Filter along with responses from subsequent interrogation pulses to maintain a current range estimate.

8. The invention according to claim 7 and further including providing an additional W bins overlapping the prior bins to avoid problems when a range falls on a bin division.

9. In a Tacan receiver, means to decode the Tacan bearing comprising:

a. means to detect the time of arrival of each signal pulse and to provide an output indicative thereof;

b. means to detect the amplitude of each signal pulse and to provide an output indicative thereof;

c. means to detect the time of arrival of a reference pulse;

d. digital computing apparatus having as inputs the output of said means to detect the time of arrival of each signal pulse, means to detect the amplitude of each signal pulse and means to detect the time of arrival of a reference pulse, said digital computing means programmed to:

1. compute from the time of arrival of said reference pulses using a first Kalman Filter, the estimated frequency and phase of the transmitted signal;

2. compute from the frequency, the amplitude and the estimated frequency, using a second Kalman Filter, an estimate of the state variables of the bearing signal; and 3. compute from said state variables and the estimated phase, the bearing of the receiver with respect to the transmitting station.

10. The invention according to claim 9 wherein said Tacan receiver further includes means for transmitting interrogation pulses and wherein said digital computing means are also programmed to compute range.

11. The invention according to claim 10 wherein said digital computing means are further programmed to:

1. divide the maximum range into increments and assign a range bin to each increment;

2. between transmissions using the time of arrival of each received pulse to increment the bin corresponding to the range for that time of arrival;

3. after a predetermined number of interrogation pulses are transmitted, examine the bins and select the one with the most entries as the estimated range;

4. reduce the interrogation rate;

5. use said estimated range as the initial value in a third Kalman Filter along with responses from subsequent interrogation pulses to maintain a current range estimate.

* * * * *